J. SCHEDLER.
Apparatus for Teaching Geography.

No. 143,934. Patented Oct. 21, 1873.

Witnesses:
Ernst Bilhuber
Henry Gentner

Inventor:
Joseph Schedler
Van Santvoord & Hauff
Attys

UNITED STATES PATENT OFFICE.

JOSEPH SCHEDLER, OF JERSEY CITY HEIGHTS, NEW JERSEY.

IMPROVEMENT IN APPARATUS FOR TEACHING GEOGRAPHY.

Specification forming part of Letters Patent No. 143,934, dated October 21, 1873; application filed August 15, 1873.

*To all whom it may concern:*

Be it known that I, JOSEPH SCHEDLER, of Jersey City Heights, in the county of Hudson and State of New Jersey, have invented new and Improved Combined Planisphere Maps and Hemisphere Globes; and I do hereby declare the following to be a full, clear, and exact description thereof, which will enable those skilled in the art to make and use the same, reference being had to the accompanying drawing, forming part of this specification, in which drawing—

Figure 1:
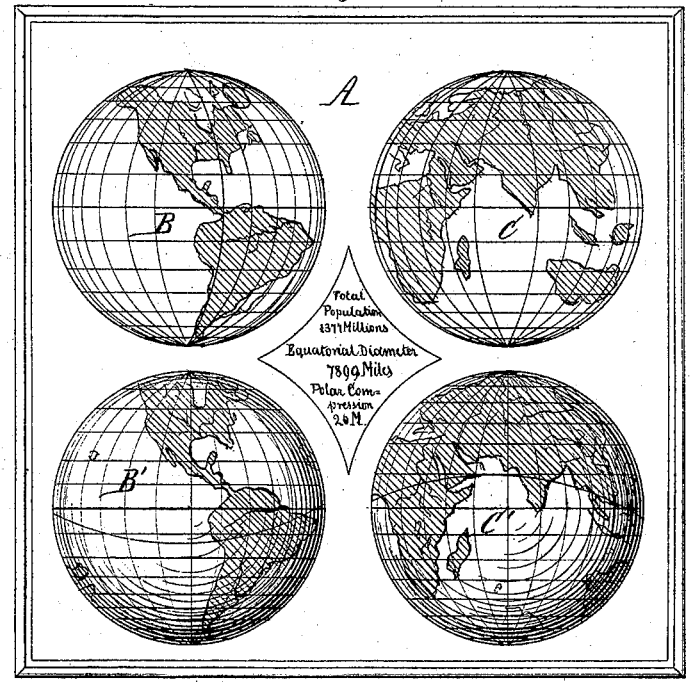
Figure 2:
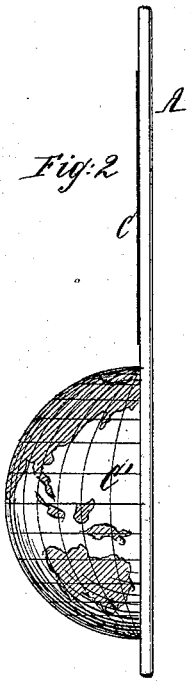

Figure 1 is a plan view of my improvement. Fig. 2 is a side view thereof.

Similar letters indicate corresponding parts.

This invention consists in combining together upon the same chart a planispherical map or maps of the earth and hemispherical globes thereof.

My invention is especially designed for the use of teachers and scholars; but is also well adapted for use in private houses and places of business.

One of the advantages of my invention consists in presenting to the observer, by means of the globes, the spherical character of the earth's surface, so that he is enabled, from the same chart, to correct any false ideas of relative place or distance which may arise from the planisphere maps.

In this example of my invention I have arranged planisphere maps B C of the eastern and western hemispheres, upon the upper part of a chart or board, A, and have placed below said maps hemispherical globes B' C', of the corresponding hemispheres, so that the globes of either hemisphere shall be below the map of that hemisphere. That portion of the chart A which is not occupied by the maps and globes can be used to show other information or statistics.

My invention is applicable to other planetary bodies as well as to the earth.

What I claim as new, and desire to secure by Letters Patent, is—

A card or plate for teaching geography, provided with the planispheric maps B C, and hemispheric maps B' C', arranged substantially as described.

JOS. SCHEDLER.

Witnesses:
W. HAUFF,
E. F. KASTENHUBER.